US006261465B1

(12) United States Patent
Hancock

(10) Patent No.: US 6,261,465 B1
(45) Date of Patent: Jul. 17, 2001

(54) CALCIUM ALUMINATE BASED CATALYST AND USE OF THE CATALYST

(75) Inventor: Frederick Ernest Hancock, Stockton (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/271,647

(22) Filed: Mar. 18, 1999

Related U.S. Application Data

(63) Continuation of application No. PCT/GB97/02223, filed on Aug. 18, 1997.

(30) Foreign Application Priority Data

Sep. 20, 1996 (GB) .................................... 9619724

(51) Int. Cl.$^7$ ............................... C02F 1/00; B01J 23/75; B01J 23/755
(52) U.S. Cl. .......................... 210/763; 502/326; 502/337; 502/327
(58) Field of Search ..................................... 502/326, 327, 502/328, 332, 335, 337; 210/763

(56) References Cited

U.S. PATENT DOCUMENTS

| 3,549,556 | * | 12/1970 | Diennes . |
| 3,931,053 | * | 1/1976 | Kazakov et al. . |
| 4,988,661 | * | 1/1991 | Arai et al. . |
| 5,041,408 | * | 8/1991 | King et al. . |
| 5,772,897 | * | 6/1998 | Hancock . |
| 6,020,285 | * | 2/2000 | Hancock . |

\* cited by examiner

Primary Examiner—Steven P. Griffin
Assistant Examiner—Christina Ildebrando
(74) Attorney, Agent, or Firm—Pillsbury Winthrop LLP

(57) ABSTRACT

Shaped units suitable for use as a catalyst, e.g. for the decomposition of hypochlorite, comprise a compacted particulate mixture of at least one oxide of a Group VIII metal M selected from nickel and cobalt, a calcium aluminate cement, and alumina and/or magnesia, the shaped units having (after ignition in air at 900° C.) a content of a Group VIII metal oxide of 10 to 50% by weight (expressed as the divalent oxide, MO), a calcium oxide content of 1 to 10% by weight, an alumina content by weight that is at least four times the weight of calcium oxide, a total content of alumina plus magnesia of at least 40% by weight, a silica content of less than 1% by weight, and the shaped units having a pore volume in the range 0.2 to 0.5 ml/g and having a pore size distribution such that from 5 to 25% of the total pore volume is in the form of pores of diameter in the range 15 to 35 nm, at least 30% of the total pore volume is in the form of pores of diameter greater than 35 nm, and 10 to 20% of the total pore volume is in the form of pores of diameter greater than 1500 nm.

12 Claims, No Drawings

CALCIUM ALUMINATE BASED CATALYST AND USE OF THE CATALYST

This is a continuation under 35 U.S.C. Section 120 of International application Ser. No. PCT/GB97/02223 filed on Aug. 18, 1997 which application designates the U.S.

This invention relates to catalysts and in particular to catalysts, or precursors thereto, containing an inert support material and at least one oxide of a metal of Group VIII of the Periodic Table and selected from nickel and cobalt.

In our EP 0 397 342 we describe catalysts in the form of shaped units, e.g. extrudates, containing a calcium aluminate cement, an oxide of cobalt and/or nickel, and optionally a finely divided diluent material, the shaped units having specified porosity and specified pore size distribution characteristics. Inter alia, the units had a porosity of 25–50% and less than 40% of the total pore volume was in the form of pores of size greater than 35 nm. These catalysts were of particular utility for the decomposition of hypochlorite ions in an aqueous medium.

In that specification we indicated that increasing the porosity of the units was desirable as it allows the reactants to have ready access to the active material within the units. However this had the disadvantage that the strength of the units was decreased.

Methanation catalysts having a high porosity and based upon nickel oxide, alumina and a calcium aluminate cement are described in GB 1 278 424. Those materials were granules made by a dish granulation technique and had a high porosity (55–75%) and at least 80% of the total pore volume was formed from pores of size greater than 35 nm. The bulk density of the catalysts was relatively low, namely 0.4 to 0.656 g/ml. As shown in the aforesaid EP 0 397 342, granules made in accordance with the procedure of GB 1 278 424 had a low crush strength and, when employed for hypochlorite decomposition, rapidly disintegrated and were leached away.

In our PCT application GB 96/01698 (now published as WO 97 04870) we showed that by employing a calcium aluminate cement having a high alumina content, the porosity of catalysts of the type described in the aforesaid EP 0 397 342 can be increased without undue loss of strength and as a result the activity of the catalyst can be increased.

We have now devised catalysts of still greater activity. In the aforesaid EP 0 397 342 and PCT application GB 96/01698, although described as being optional, all the exemplified materials contained a significant amount of kaolin as a clay diluent. As a result the catalysts contained a significant amount of silica. We have found that if the day is omitted and alumina, alone or in combination with magnesia, is employed as a diluent, catalysts of greater macroporosity and activity, but still having adequate strength, can be obtained.

Surprisingly, despite the higher porosity, a relatively high bulk density can be achieved so that a significant mass of units, and hence active material, can be accommodated in a catalyst bed of given volume. [The bulk density is determined by filling a vessel of known volume with the catalyst units, with tapping of the vessel to ensure that the units settle, and then determining the weight of units in the vessel.]

Accordingly the present invention provides shaped units suitable for use as a catalyst, or precursor thereto, comprising a compacted particulate mixture of at least one oxide of a Group VIII metal M selected from nickel and cobalt, a calcium aluminate cement, and alumina and/or magnesia, said shaped units having (after ignition in air at 900° C.) a content of said Group VIII metal oxide of 10 to 50% by weight (expressed as the divalent oxide, MO), a calcium oxide content of 1 to 10% by weight, an alumina content by weight that is at least four times the weight of calcium oxide, a total content of alumina plus magnesia of at least 40% by weight, and a silica content of less than 1% by weight, and said shaped units having a pore volume in the range 02 to 0.5 ml/g and having a pore size distribution such that from 5 to 25% of the total pore volume is in the form of pores of diameter in the range 15 to 35 nm, at least 30% of the total pore volume is in the form of pores of diameter greater than 35 nm, and 10 to 20% of the total pore volume is in the form of pores of diameter greater than 1500 nm.

Thus in the shaped units of the invention, there are substantial amounts of porosity in the form of pores in the size ranges 15 to 35 nm and 35 to 1500 nm, and a significant, but not excessive, amount of macroporosity in the form of pores of size above 1500 nm.

As used herein the porosity of the units is determined by mercury intrusion porosimetry, i.e. by measuring the volume of mercury intruded into a sample of the units at increasing applied pressures. As defined herein the total pore volume of a sample of the units is the volume of mercury intruded into the sample at a pressure corresponding to intrusion of all open pores of diameter greater than 3.5 nm. The proportion of pores of size above 35 nm is the ratio between a) the volume of mercury intruded into the sample at a pressure corresponding to intrusion of all open pores of diameter greater than 35 nm and b) the total pore volume. Correspondingly the proportion of pores of size above 1500 nm is the ratio between a) the volume of mercury intruded into the sample at a pressure corresponding to intrusion of all open pores of diameter greater than 1500 nm and b) the total pore volume, and the proportion of pores of size in the range 15–35 nm is the ratio between a) the difference between the volume of mercury intruded into the sample at a pressure corresponding to intrusion of all open pores of diameter greater than 15 nm and the volume of mercury intruded into the sample at a pressure corresponding to intrusion of all open pores of diameter greater than 35 nm and b) the total pore volume.

In the units of the invention, in order to give a high activity, the pore volume is in the range 02 and 0.5 ml/g, preferably 02 to 0.4 ml/g, and at least 30%, preferably 35 to 80%, of the total pore volume is in the form of pores of diameter above 35 nm, and at least 10% of the total pore volume is in the form of pores of size above 1500 nm. The presence of a substantial proportion of the pore volume in the form of the large pores, i.e. above 35 nm and above 1500 nm permits ready access of the reactants to the active material within the shaped units, and, where, the shaped units are used as catalysts for the decomposition of oxidants, facilitates the passage of gaseous oxygen formed from such decomposition out of the shaped units.

However, in order that the units have adequate strength, it is important that not more than 20% of the pore volume is in the form of pores of diameter above 1500 nm and that substantial proportion of the porosity is given by pores of size less than 35 nm diameter. Thus in the units of the invention 5 to 25%, preferably 10 to 20%, of the total pore volume is given by pores of diameter in the range 15 to 35 nm. Indeed it is preferred that at least 10% of the total pore volume is provided by pores of diameter below 15 nm. The presence of a substantial proportion of pores of diameter below 35 nm also ensures that the BET surface area of the shaped units is relatively high. It is preferred that the BET surface area is at least 10, and in particular in the range 20–100, $m^2/g$. As a result the active material is present in a finely divided state. Such a BET surface area may be achieved by introducing the Group VIII metal oxide into the composition by a precipitation route as described hereinafter.

As a result of their composition and porosity, the shaped units of the invention have a bulk density in the range 0.8 to 1.5, preferably 0.9 to 1.4, $g.cm^{-3}$. The bulk density is indicative of the weight of catalyst in a bed of given volume.

The shaped units are preferably in the form of granules, extrudates, or pellets and preferably have an aspect ratio, by which we mean the ratio of the weight average maximum geometric dimension, e.g. length, to weight average minimum geometric dimension, e.g. diameter, of less than 3, particularly less than 2. Shaped units having a greater aspect ratio may be liable to suffer from breakage during use. The shaped units preferably have a weight average maximum dimension in the range 2 to 8 mm, particularly 3 to 8 mm. This ensures that the shaped units have a relatively high a geometric surface area per unit bed volume, so that a bed of the units has a relatively large external area exposed to the reactants without the presence of an undue proportion of fines which would lead to unacceptable pressure drop on passage of reactants through a bed of the units.

Shaped units having the required porosity and pore volume characteristics may be made by a particular pelleting method as described hereinafter.

The units comprise a compacted intimate particulate mixture of the Group VIII metal oxide or oxides, i.e. nickel and/or cobalt oxides, together with alumina and/or magnesia, and a calcium aluminate cement. Preferably the Group VIII metal is nickel alone, or nickel in admixture with cobalt in an amount of up to one mole of cobalt per mole of nickel. The Group VIII metal oxide is preferably introduced into the composition by precipitation. A preferred route is to precipitate Group VIII metal compounds, decomposable to oxides by heating, from an aqueous solution of e.g. nitrates by addition of a precipitant such as an alkali metal carbonate solution. After precipitation of the Group VIII metal compounds, the precipitate is washed free of precipitant. The precipitate is then mixed with a diluent comprising finely divided magnesia and/or alumina, e.g. alumina trihydrate. The mixture is then dried, and calcined, e.g. to a temperature in the range 200–600° C., particularly 400–550° C., to effect decomposition of the Group VIII metal compounds to the oxide form. Some or all of the diluent may be incorporated into the mixture by co-precipitation with the Group VIII metal compounds. The resultant composition is then mixed with the calcium aluminate cement, optionally together with a processing aid such as a little water, a stearate of an alkaline earth metal, e.g. magnesium, and/or graphite, and formed into pellets. In order to increase the porosity still further, an organic extender/shaping aid such as powdered cellulose may be added to the mixture before shaping. Such an organic extender may be removed from the pellets by calcination, although it will leach out of the shaped units upon use as a catalyst for treating aqueous effluents: however the pellets should be calcined to remove the extender before determining the porosity.

Calcium aluminate cements are hydraulic cements containing one or more calcium aluminate compounds of the formula $nCaO.mAl_2O_3$ where n and m are integers such as calcium mono-aluminate $CaO.Al_2O_3$, calcium di-aluminate $CaO.2Al_2O_3$, tri-calcium aluminate $3CaO.Al_2O_3$, penta-calcium tri-aluminate $5CaO.3Al_2O_3$, tri-calcium penta-aluminate $3CaO.5Al_2O_3$, and dodeca-calcium hepta-aluminate $12CaO.7Al_2O_3$ and may include additional alumina. The calcium aluminate cement used preferably is a high alumina cement by which we mean a calcium aluminate cement having an aluminium to calcium atomic ratio above 2.5. Calcium aluminate cements are often contaminated with iron compounds, e.g. iron oxide. In the aforesaid EP 0 397 342 we indicated that the presence of iron oxide was beneficial where the shaped particles were to be used for hypochlorite decomposition as the iron exhibited some promoting effect on the catalytic activity. In contrast, in the present invention we have found that high activity catalysts can be produced using cements of low iron oxide content. In the present invention, the iron oxide content (expressed as $Fe_2O_3$) of the shaped units is preferably less than 1% by weight. A particularly suitable high alumina cement having a low iron oxide content is that known as CA-25 which typically contains about 80% by weight of alumina, primarily as mono-calcium aluminate in admixture with dodeca-calcium hepta-aluminate, calcium di-aluminate, and free alumina.

The proportion of cement employed is generally 25 to 100% by weight based on the total weight of the Group VIII metal oxide, or oxides, and diluent material, and is such as to give a composition containing (after ignition at 900° C.) 1 to 10% of calcium oxide, and 10 to 50%, and most preferably 20 to 45%, by weight of the Group VIII metal oxide or oxides.

In the overall composition, the amount of alumina (including that present as calcium aluminate compounds) should be such that the composition, after ignition at 900° C., has an alumina content that is at least four times the calcium oxide content by weight, and the amount of diluent is such that the total weight of alumina (including that present as calcium aluminate compounds), plus magnesia (if any), is at least 40% by weight. Preferably the total content of alumina (including that present as calcium aluminate compounds) is at least 45% by weight.

In order to give the desired high activity, the composition should contain, after ignition at 900° C., less than 1%, preferably less than 0.5% by weight of silica.

In order to obtain shaped units of the requisite pore volume characteristics, the mixture is conveniently pelletised by means of a pellet mill, for example of the type used for pelleting animal feedstuffs, wherein the mixture to be pelleted is charged to a rotating perforate cylinder through the perforations of which the mixture is forced by a bar or roller within the cylinder. The resulting extruded mixture is cut from the surface of the rotating cylinder by a doctor knife positioned to give pellets of the desired length. It will be appreciated that other extrusion techniques may be employed to give shaped units of the desired characteristics.

After forming the composition into the desired shaped units, the latter are then preferably contacted with water, preferably as steam, to effect hydration of the cement and to give the shaped particles adequate strength.

Shaped units formed by this method have a significantly lower strength, e.g. as measured by a crushing test, than pellets prepared by a conventional tabletting technique but it is found that, even so, the strength is adequate for the applications envisaged and, indeed, the strength generally increases where the catalyst is employed for the decomposition of oxidising agents in aqueous media, presumably as a result of continued hydration of the cement As described in the aforesaid EP 0 397 342, for some catalytic applications the Group VIII metal oxide is the catalytically active species while for other catalytic applications the Group VIII metal oxide is a catalyst precursor and the catalytically active species is the product of reducing the Group VIII metal oxide to the Group VIII metal or is the product of oxidising the Group VIII metal oxide in the precursor to a higher oxidation state. For example catalysts obtained by reduction of a precursor containing nickel and/or cobalt oxide are of use as hydrogenation catalysts, e.g. methanation catalysts for the hydrogenation of carbon oxides to methane or catalysts for the hydrogenation of aromatic compounds such as benzene to cyclohexane. As previously indicated, an important use of supported nickel and/or cobalt oxides is as catalysts for the decomposition of oxidising agents such as hypochlorite ions in aqueous solutions, for example in the treatment of effluents containing such ions prior to discharge of into rivers, lakes, or estuaries.

For use for the decomposition of oxidising agents, the catalyst bed is contacted with a fluid medium, particularly aqueous, containing the oxidising agent to be treated. Examples of oxidising agents that may be decomposed using the shaped particles of the invention include hypohalite ions, for example hypochlorite and hypobromite ions, and hydrogen peroxide. At least some of such oxidising agents are pollutants in various industrial processes. In particular hypochlorite ions are a significant industrial pollutant. The catalysts may also find utility in the treatment of aqueous media containing organic pollutants: thus as hypochlorite may be added to an aqueous medium containing an oxidisable organic compound and the solution passed through a bed of the catalyst. The catalyst catalyses the decomposition of the hypochlorite which effects oxidation of the organic compound to more environmentally acceptable products such as carbon dioxide and water.

Conveniently a fixed bed of the catalyst units is formed and the medium containing the oxidising agent, for example hypochlorite ions, is passed through the bed. Generally the medium is in the form of an aqueous solution which has been filtered prior to contact with the catalyst bed.

The treatment of aqueous media is conveniently effected under conditions such that the pH of the medium is above 7, preferably above 8; it is a particularly beneficial aspect of the invention that the units do not physically disintegrate even at pH levels in the range 10 to 14. The process can be performed at any convenient temperature, suitably in the range 5–100° C., more suitably in the range 20–80° C.

When the shaped units are contacted with the oxidising agent in an aqueous medium, some or all of the oxides of the units may become hydrated. In addition the Group VIII metal oxides are oxidised to higher valency states. For example nickel oxide can be notionally considered to be initially present in the units as NiO. Authorities vary as to precisely what higher oxides of nickel are formed but it may be regarded that the higher oxides $Ni_3O_4$, $Ni_2O_3$ and $NiO_2$ are formed on contact with the oxidising agent. Such higher oxides are active in the process of decomposition of the oxidising agent. In the units of the present invention, the Group VIII metal oxides may be as initially formed, or in their higher oxidation states as formed in use. In use the oxides may also be present as hydrates. It should be noted, however, that the proportions specified herein of the Group VIII metal oxide in the units are expressed on the basis of anhydrous oxides with the Group VIII oxides in the divalent state, i.e. NiO and/or CoO.

In addition to use for the decomposition of oxidising agents as described above, the shaped units of the invention are also of use as precursors to hydrogenation catalysts, and may be converted to the catalytically active form by reduction, e.g. with a stream of a hydrogen-containing gas at an elevated temperature. Such reduction may be effected after charging the units to a vessel in which the hydrogenation is to be effected. Alternatively, the reduction may be effected as a separate step prior to charging the units to the hydrogenation reactor and, if desired, the reduced units may be passivated by contact with a gas stream containing a small amount of oxygen, or with carbon dioxide followed by a gas stream containing a small amount of oxygen, until no further reaction occurs when the units may then be handled in air at ambient temperature.

During use of the units as a catalyst for the decomposition of oxidising agents, e.g. in effluents, the BET surface area, porosity and/or pore size distribution may change. The surface area, density, and porosity parameters of the shaped units referred to herein refer to the parameters of the units in the "as made" state, i.e. before use for catalytic purposes. However, as indicated above, where an organic extender is included in the composition from which the units are made, the units should be calcined to burn out the extender before determining the porosity.

The invention is illustrated by the following examples in which all parts and percentages are by weight.

EXAMPLE 1

A slurry containing precipitated basic nickel carbonate, and a mixture of finely divided magnesia and alumina trihydrate as diluent materials, was filtered, washed, dried, and then calcined at 400–450° C. to give a fine powder. The proportions of the ingredients were such that the calcined material had the following analysis (% by weight as measured on a sample ignited at 900° C.)

| | |
|---|---|
| nickel oxide | 65% |
| alumina | 30% |
| magnesia | 5% |
| calcium oxide | <0.1% |
| silica | none detected |
| iron oxide | none detected |

100 parts of the calcined material were then mixed with about 2 parts of graphite and 42 parts of a high alumina cement, CA-25, having an aluminium to calcium atomic ratio of about 4.9 and having an iron oxide content of about 0.2% to give a dry feed mixture.

The dry feed mixture was then mixed with water (25 parts per 100 parts of the cement-containing mixture), formed into extruded pellets of diameter of about 1.6 mm and lengths in the range of about 3 to 5 mm using a pellet mill as described hereinbefore, and then dried to give extrudates A.

The activity of the catalysts for the decomposition of hypochlorite was assessed by charging 130 ml of the extrudates to a reactor of internal diameter 2.5 cm to form a catalyst bed therein. A feed of an aqueous solution containing 0.53% by weight of sodium hypochlorite was preheated to about 30° C. was fed to the reactors at a space velocity of 1 $h^{-1}$ so that the hypochlorite solution flowed down through the catalyst bed. After several days operation, the exit sodium hypochlorite concentration was determined.

EXAMPLES 2–5

The above procedure was repeated (extrudates B, C, D and E) using slightly differing proportions of ingredients in order to obtain a series of products having different nickel oxide contents. In the case of extrudates D, in order to increase the porosity still further, powdered cellulose was added to the mixture of the calcined material and calcium aluminate cement in place of the graphite before extrusion, and the resultant extrudates were calcined at 450° C. to burn the cellulose out. The amount of cellulose was about 1.9 parts per 100 parts of the mixture of the calcined material and cement.

EXAMPLES 6–7 (Comparative)

For purposes of comparison the above procedure was repeated (extrudates Comp I and Comp II) but replacing the alumina trihydrate in both cases with kaolin, and, in Comp II using a calcium aluminate cement having an aluminium to calcium atomic ratio of about 1.1 and an iron oxide content (expressed as $Fe_2O_3$) of about 14% in place of the high alumina cement. The composition and properties of the extrudates, and the exit sodium hypochlorite concentrations obtained, are shown in the following table.

|  |  | Extrudates | | | | | | |
|---|---|---|---|---|---|---|---|---|
|  |  | A | B | C | D | E | Comp I | Comp II |
| Composition | NiO | 45.6 | 39.6 | 41.7 | 30.0 | 34.0 | 31.3 | 31.1 |
| (wt % - after | $Al_2O_3$ | 45.2 | 51.6 | 49.7 | 60.2 | 56.0 | 38.5 | 26.9 |
| ignition at 900° C.) | CaO | 5.4 | 5.5 | 5.1 | 5.2 | 6.4 | 5.3 | 11.7 |
|  | MgO | 3.1 | 2.7 | 2.9 | 4.2 | 3.5 | 4.5 | 4.6 |
|  | $SiO_2$ | <0.1 | <0.1 | <0.1 | <0.1 | <0.1 | 20.0 | 21.2 |
|  | $Fe_2O_3$ | <0.1 | <0.1 | <0.1 | <0.1 | <0.1 | 0.4 | 4.5 |
| Pore volume (ml/g) |  | 0.24 | 0.29 | 0.27 | 0.38 | 0.29 | 0.21 | 0.22 |
| Pore volume | <15 nm | 24 | 10 | 15 | 51 | 21 | 27 | 15 |
| (% of total | 15–35 nm | 17 | 11 | 13 | 10 | 14 | 14 | 18 |
| pore volume) | >35 nm | 59 | 79 | 72 | 39 | 65 | 59 | 67 |
|  | >1500 nm | 14 | 14 | 12 | 16 | 13 | 9 | 8 |
| Bulk density (g/ml) |  | 0.94 | 1.16 | 1.18 | 0.96 | 0.94 | 1.20 | 1.06 |
| BET surface area ($m^2$/g) |  | 64 | 30 | 41 | 116 | 72 | 46 | 59 |
| Exit conc of NaOCl (ppm wt) |  | <10 | <10 | <10 | <10 | 11 | 25 | 93 |

It is seen that the units of the invention gave significantly lower outlet hypochlorite concentrations, indicating that the catalysts were more active, than the silica-containing catalysts Comp I and Comp II.

What is claimed is:

1. Shaped units suitable for use as a catalyst, or precursor thereto, comprising a compacted particulate mixture of at least one oxide of a Group VIII metal M selected from nickel and cobalt, a calcium aluminate cement, and alumina and/or magnesia, said shaped units having (after ignition in air at 900° C.) a content of said Group VIII metal oxide of 10 to 50% by weight (expressed as the divalent oxide, MO), a calcium oxide content of 1 to 10% by weight, an alumina content including that present as calcium aluminate compounds by weight that is at least four times the weight of calcium oxide, a total content of alumina including that present as calcium aluminate compounds plus magnesia of at least 40% by weight, and a silica content of less than 1% by weight, and said shaped units having a pore volume in the range 0.2 to 0.5 ml/g and having a pore size distribution such that from 5 to 25% of the total pore volume is in the form of pores of diameter in the range 15 to 35 nm, at least 30% of the total pore volume is in the form of pores of diameter greater than 35 nm, and 10 to 20% of the total pore volume is in the form of pores of diameter greater than 1500 nm.

2. Shaped units according to claim 1 wherein the pore volume is in the range 0.2 to 0.4 ml/g.

3. Shaped units according to claim 1 wherein 35 to 80% of the pore volume is in the form of pores of diameter above 35 nm.

4. Shaped units according to claim 1 wherein 10 to 20% of the pore volume is in the form of pores of diameter 15 to 35 nm.

5. Shaped units according to claim 1 wherein at least 10% of the pore volume is in the form of pores of diameter less than 15 nm.

6. Shaped units according to claim 1 having a BET surface area above 10 $m^2$/g.

7. Shaped units according to claim 1 having a bulk density in the range 0.9 to 1.4 g.$cm^3$.

8. Shaped units according to claim 1 having a content of said Group VIII metal oxide in the range 20 to 45% by weight.

9. Shaped units according to claim 1 having a total content of alumina of at least 45% by weight.

10. A process for the decomposition of an oxidising agent in an aqueous medium comprising passing said aqueous medium through a bed of shaped units according to claim 1.

11. Shaped units suitable for use as a catalyst, or precursor thereto, comprising a compacted particulate mixture of at least one oxide of a Group VIII metal M selected from nickel and cobalt, a calcium aluminate cement, and alumina and/or magnesia, said shaped units having (after ignition in air at 900° C.) a content of said Group VIII metal oxide of 10 to 50% by weight (expressed as the divalent oxide, MO), a calcium oxide content of 1 to 10% by weight, an alumina content, including that present as calcium aluminate compounds, by weight that is at least four times the weight of calcium oxide, a total content of alumina, including that present as calcium aluminate compounds, plus magnesia of at least 40% by weight, and a silica content of less than 1% by weight, and said shaped units having a pore volume in the range 0.2 to 0.5 ml/g and having a pore size distribution such that at least 10% of the pore volume is in the form of pores of diameter less than 15 nm, from 5 to 25% of the total pore volume is in the form of pores of diameter in the range 15 to 35 nm, at least 30% of the total pore volume is in the form of pores of diameter greater than 35 nm, and 10 to 20% of the total pore volume is in the form of pores of diameter greater than 1500 nm.

12. Shaped units suitable for use as a catalyst, or precursor thereto, comprising a compacted particulate mixture of at least one oxide of a Group VIII metal M selected from nickel and cobalt, a calcium aluminate cement, and alumina and/or magnesia, said shaped units having (after ignition in air at 900° C.) a content of said Group VIII metal oxide of 10 to 50% by weight (expressed as the divalent oxide, MO), a calcium oxide content of 1 to 10% by weight, an alumina content, including that present as calcium aluminate compounds, by weight that is at least four times the weight of calcium oxide, a total content of alumina, including that present as calcium aluminate compounds, plus magnesia of at least 40% by weight, and a silica content of less than 1% by weight, and said shaped units having a pore volume in the range 0.2 to 0.5 ml/g and having a pore size distribution such that from 5 to 25% of the total pore volume is in the form of pores of diameter in the range 15 to 35 nm, at least 30% of the total pore volume is in the form of pores of diameter greater than 35 nm, and 10 to 20% of the total pore volume is in the form of pores of diameter greater than 1500 nm, said shaped units having a bulk density in the range 0.9 to 1.4 $g.cm^{-3}$.

* * * * *